(12) United States Patent
Mokhtari et al.

(10) Patent No.: US 9,865,024 B2
(45) Date of Patent: Jan. 9, 2018

(54) SYSTEMS AND METHODS OF DETERMINING OPTIMAL SCHEDULING AND DISPATCH OF POWER RESOURCES

(71) Applicant: Open Access Technology International, Inc., Minneapolis, MN (US)

(72) Inventors: Sasan Mokhtari, Eden Prairie, MN (US); Ali Ipakchi, San Carlos, CA (US); Abdolhossein Rahimi, Redwood City, CA (US); Guillermo Irisarri, Plymouth, MN (US); Jose Medina Palomo, Minneapolis, MN (US); Behnam Danai, Cupertino, CA (US); Nelson Muller, Plymouth, MN (US); Farrokh Albuyeh, San Carlos, CA (US)

(73) Assignee: Open Access Technology International, Inc., Minneapolis, MN (US)

( * ) Notice: Subject to any disclaimer, the term of this patent is extended or adjusted under 35 U.S.C. 154(b) by 631 days.

(21) Appl. No.: 14/216,138

(22) Filed: Mar. 17, 2014

(65) Prior Publication Data
US 2014/0277797 A1    Sep. 18, 2014

Related U.S. Application Data

(60) Provisional application No. 61/792,575, filed on Mar. 15, 2013.

(51) Int. Cl.
*G06Q 50/06* (2012.01)
*G06Q 30/02* (2012.01)

(52) U.S. Cl.
CPC ......... *G06Q 50/06* (2013.01); *G06Q 30/0202* (2013.01); *Y04S 50/14* (2013.01)

(58) Field of Classification Search
None
See application file for complete search history.

(56) References Cited

U.S. PATENT DOCUMENTS

| 7,343,360 B1 * | 3/2008 | Ristanovic | G06Q 30/08 705/412 |
| 8,417,391 B1 * | 4/2013 | Rombouts | G05B 13/02 700/286 |

(Continued)

OTHER PUBLICATIONS

Volk, D., "Electricity Networks: Infrastructure and Operations, Too Complex for a Resource?", 2013, International Energy Agency.*

(Continued)

*Primary Examiner* — Mohammad Ali
*Assistant Examiner* — Kelvin Booker
(74) *Attorney, Agent, or Firm* — Vidas, Arrett & Steinkraus (57) ABSTRACT

A system and process/method is provided, which economically optimizes the dispatch of various electrical energy resources. The disclosed process/method is linked to and communicates with various sources of input data, including but not limited to, EMS/SCADA legacy Energy Management Systems (EMS), legacy Supervisory Control and Data Acquisition (SCADA) Systems, Demand Response (DR) and Distributed Energy Resources (DER) monitor, control, schedule, and lifecycle management systems (DR/DER Management System), and Energy Markets, electrical energy commodity trading systems (Trading Systems), and Operations System (OPS) in order to compute optimal day-ahead, day-of, and real-time schedules of various durational length for generation, demand response and storage resources while taking into account bilateral contracts and market-based trade opportunities.

14 Claims, 3 Drawing Sheets

(56) References Cited

U.S. PATENT DOCUMENTS

| | | | | |
|---|---|---|---|---|
| 8,886,361 B1* | 11/2014 | Harmon | G06Q 10/04 | 700/291 |
| 8,972,070 B2* | 3/2015 | Sun | G06F 17/30557 | 700/286 |
| 9,026,473 B2* | 5/2015 | Chassin | G06Q 30/08 | 361/601 |
| 9,063,525 B2* | 6/2015 | Sanders | G05B 11/01 | |
| 9,087,359 B2* | 7/2015 | Chassin | G06Q 30/08 | |
| 9,129,337 B2* | 9/2015 | Chassin | G06Q 30/08 | |
| 9,251,479 B2* | 2/2016 | Sun | G06Q 10/06 | |
| 9,639,103 B2* | 5/2017 | Darden, II | G05F 1/66 | |
| 2003/0171851 A1* | 9/2003 | Brickfield | H02J 3/008 | 700/286 |
| 2004/0117330 A1* | 6/2004 | Ehlers | F24F 11/0012 | 705/412 |
| 2004/0215529 A1* | 10/2004 | Foster | G06Q 30/06 | 705/26.1 |
| 2005/0197742 A1* | 9/2005 | Scott | G06Q 40/04 | 700/286 |
| 2008/0039979 A1* | 2/2008 | Bridges | B60L 11/1816 | 700/292 |
| 2008/0039980 A1* | 2/2008 | Pollack | B60L 11/1824 | 700/295 |
| 2008/0039989 A1* | 2/2008 | Pollack | B60L 11/1811 | 701/22 |
| 2008/0040223 A1* | 2/2008 | Bridges | B60L 11/1816 | 705/14.69 |
| 2008/0040295 A1* | 2/2008 | Kaplan | B60L 11/1816 | 705/412 |
| 2008/0040296 A1* | 2/2008 | Bridges | G01D 4/004 | 705/412 |
| 2008/0177678 A1* | 7/2008 | Di Martini | G01D 4/002 | 705/412 |
| 2009/0043520 A1* | 2/2009 | Pollack | B60L 3/12 | 702/62 |
| 2009/0187284 A1* | 7/2009 | Kreiss | G06Q 50/06 | 700/291 |
| 2009/0326726 A1* | 12/2009 | Ippolito | H02J 3/14 | 700/291 |
| 2010/0106332 A1* | 4/2010 | Chassin | G06Q 20/102 | 700/278 |
| 2010/0179862 A1* | 7/2010 | Chassin | G06Q 10/06 | 705/412 |
| 2010/0295482 A1* | 11/2010 | Chemel | H05B 37/029 | 315/312 |
| 2010/0301774 A1* | 12/2010 | Chemel | H05B 37/029 | 315/297 |
| 2010/0324962 A1* | 12/2010 | Nesler | G05B 15/02 | 705/7.36 |
| 2010/0332373 A1* | 12/2010 | Crabtree | G06Q 40/04 | 705/37 |
| 2011/0022434 A1* | 1/2011 | Sun | G06Q 10/04 | 705/7.37 |
| 2011/0040420 A1* | 2/2011 | Lenox | H02J 3/383 | 700/295 |
| 2011/0106328 A1* | 5/2011 | Zhou | G05B 13/024 | 700/291 |
| 2011/0196546 A1* | 8/2011 | Muller | H02J 3/383 | 700/295 |
| 2011/0231028 A1* | 9/2011 | Ozog | G06Q 10/06 | 700/291 |
| 2011/0258018 A1* | 10/2011 | Tyagi | G06Q 30/02 | 705/7.33 |
| 2012/0191262 A1* | 7/2012 | Marcus | G06Q 30/0202 | 700/286 |
| 2012/0296482 A1* | 11/2012 | Steven | G06Q 50/06 | 700/291 |
| 2013/0166081 A1* | 6/2013 | Sanders | G05B 15/02 | 700/286 |
| 2013/0166084 A1* | 6/2013 | Sedighy | G06Q 50/06 | 700/291 |
| 2013/0204443 A1* | 8/2013 | Steven | G06Q 50/06 | 700/286 |
| 2013/0261817 A1* | 10/2013 | Detmers | H02J 3/382 | 700/287 |
| 2013/0261823 A1* | 10/2013 | Krok | G05F 5/00 | 700/291 |
| 2014/0018971 A1* | 1/2014 | Ellis | G06Q 10/04 | 700/297 |
| 2014/0039965 A1* | 2/2014 | Steven | G06Q 10/06315 | 705/7.25 |
| 2014/0156095 A1* | 6/2014 | Rouse | G05F 1/66 | 700/291 |
| 2014/0207301 A1* | 7/2014 | San Andres | G06F 1/30 | 700/295 |
| 2014/0214222 A1* | 7/2014 | Rouse | G06Q 50/06 | 700/291 |
| 2014/0277599 A1* | 9/2014 | Pande | G06Q 50/06 | 700/22 |
| 2014/0277808 A1* | 9/2014 | Irisarri | G05B 15/02 | 700/295 |
| 2014/0324662 A1* | 10/2014 | Slutsker | G06Q 50/06 | 705/37 |
| 2015/0094968 A1* | 4/2015 | Jia | G06Q 40/04 | 702/60 |
| 2015/0276253 A1* | 10/2015 | Montalvo | G06Q 10/06 | 700/276 |
| 2015/0278968 A1* | 10/2015 | Steven | G06Q 50/06 | 705/7.35 |
| 2015/0288181 A1* | 10/2015 | Mokhtari | G05B 15/02 | 700/291 |

OTHER PUBLICATIONS

Schubert, E.; Zhou, S.; Grasso, T. and Niu, G., "A Primer on Wholesale Market Design", Nov. 1, 2002, retrieved from the Internet at "https://sites.hks.harvard.edu/hepg/Papers/TXPUC_wholesale.market.primer_11-1-02.pdf".*

North American Electric Reliability Corporation, "NERC IVGTF Task 2.4 Report, Operating Practices, Procedures and Tools", Mar. 2011, retrieved from the internet at "www.nerc.com".*

Makarov, Y.V.; Guttromson, R.T.; Huang, Z.; Subbarao, K.; Etingov, P.V.; Chakrabarti, B.B. and Ma, J., "Wind Energy Management System EMS Integration Project, Incorporating Wind Generation and Load Forecast Uncertainties into Power Grid Operations", Jan. 2010, Pacific Northwest National Laboratory, PNNL-19189.*

Cheung, K.W., "Smart Dispatch and Demand Forecasting for Large Grid Operations with Integrated Renewable Resources, Renewable Energy-Trends and Applications" Dr. Majid Nayeripour, Nov. 9, 2011, ISBN: 978-953-307-939-4.*

* cited by examiner

FIG. 3

SYSTEMS AND METHODS OF DETERMINING OPTIMAL SCHEDULING AND DISPATCH OF POWER RESOURCES

CROSS-REFERENCE TO RELATED APPLICATIONS

This application claims priority to U.S. Provisional patent application No. 61/792,575 filed Mar. 15, 2013, the entire content of which is hereby incorporated by reference.

Applicant has other co-pending applications directed to the energy market, namely:

SYSTEMS AND METHODS FOR DEMAND RESPONSE AND DISTRIBUTED ENERGY RESOURCE MANAGEMENT, filed Feb. 9, 2011 and assigned application Ser. No. 13/024,158, the entire contents of which is hereby incorporated by reference.

AUTOMATION OF ENERGY TRADING, filed Dec. 30, 2011 and assigned application Ser. No. 13/140,248, the entire contents of which is hereby incorporated by reference.

CERTIFICATE INSTALLATION AND DELIVERY PROCESS, FOUR FACTOR AUTHENTICATION, AND APPLICATIONS UTILIZING SAME, filed Oct. 15, 2013 and assigned application Ser. No. 14/054,611, the entire contents of which is hereby incorporated by reference.

A renewable energy credit management system and method, filed Feb. 10, 2014 and assigned application Ser. No. 14/176,590, the entire contents of which is hereby incorporated by reference.

Systems and methods for managing energy generation and procurement, filed on Mar. 17, 2014, application Ser. No. 14/216,148, the entire contents of which is hereby incorporated by reference.

Systems and methods for trading electrical power, filed on Mar. 17, 2014, application Ser. No. 14/216,163, the entire contents of which is hereby incorporated by reference.

Systems and methods for managing conditional curtailment options, filed on Mar. 17, 2014, application Ser. No. 14/216,179, the entire contents of which is hereby incorporated by reference.

Systems and methods for tracking greenhouse gas emissions, filed on Mar. 17, 2014, application Ser. No. 14/216,196, the entire contents of which is hereby incorporated by reference.

Systems and methods for parameter estimation for use in determining value-at-risk, filed on Mar. 17, 2014, application Ser. No. 14/216,209, the entire contents of which is hereby incorporated by reference.

Systems and methods for managing transmission service reservations, filed on Mar. 17, 2014, application Ser. No. 14/216,226, the entire contents of which is hereby incorporated by reference.

Systems and methods for interfacing an electrical energy end user with a utility, filed on Mar. 17, 2014, application Ser. No. 14/216,234, the entire contents of which is hereby incorporated by reference.

Use of Demand Response (DR) and Distributed Energy Resources (DER) to mitigate the impact of Variable Energy Resources (VER) in Power System Operation, filed on Mar. 17, 2014, application Ser. No. 14/216,247, the entire contents of which is hereby incorporated by reference.

STATEMENT REGARDING FEDERALLY SPONSORED RESEARCH

Not Applicable

FIELD OF THE INVENTION

The present disclosure relates generally to electric power and, more particularly, to systems and methods of determining optimal scheduling and dispatch of power resources.

BACKGROUND OF THE INVENTION

Power System Operators must avail and supply the electrical power grid with sufficient electrical energy to meet energy consumer demand, subject to the electrical network constraints, supply resource constraints, and constraints required by various governmental or quasi-governmental regulations. Typically available power resources, such as but not necessarily limited to, electric power generation plants, demand response, storage resources, energy made available through bilateral contracts and market-based trade opportunities (hereinafter generally and collectively referred to as "Power Resources") are scheduled to supply such service on the power grid as they are predicted or made available. Such Power Resources can be scheduled ahead of time and then adjusted to near real time to meet fluctuating, but typically predicable, user energy demand.

While economic dispatch applications have been in use in the energy industry for many years, such systems typically consider only conventional power resources, ignoring Demand Response (DR) and Distributed Energy Resources (DER) and storage resources. Incorporation of dispatchable DR/DER assets and storage resources into economic dispatch applications has yet to be successfully developed. The systems and methods described herein, however, fill this gap. The field commands to incorporate the results of economic dispatch have thus far been attempted only for conventional generating resources (through Automatic Generation Control known as AGC). A similar process to convey economic dispatch results to DR/DER field devices has been missing. This invention fills these gaps as well.

The current disclosure relates, in at least one embodiment, to the computation of the day ahead, day-of, and real-time schedules for Power Resources all while taking into account bilateral contracts and market-based trade opportunities.

BRIEF SUMMARY OF THE INVENTION

In order to solve the problems discussed above, applicants have invented systems and methods which economically optimize the dispatch of Power Resources. The systems and methods are linked to and communicate with sources of input data, including but not necessarily limited to, legacy Energy Management Systems (EMS), legacy Supervisory Control and Data Acquisition (SCADA) Systems, Demand Response (DR) and Distributed Energy Resources (DER) monitor, control, schedule, and lifecycle management systems (DR/DER Management System), and Energy Markets, electrical energy commodity trading systems (Trading Systems), and Operations System (OPS).

In one particular embodiment, the invention relates to a system and method that computes the day-ahead, day-of, and real-time schedules for generation, demand response, and storage resources, while taking into account bilateral contracts and market-based trade opportunities. In day-ahead and day-of operations, the invention may produce periodic schedules on any range of time interval, including on an hourly, half-hourly, quarter-hourly, or any other user configurable time interval. In real-time operations, the schedules are ideally produced on much shorter intervals to reflect the real-time nature of the data being observed and reported—such intervals comprising of 1 to 15 minutes, but ideally 5 minutes using computer algorithms for automated computations and information exchange. The day-ahead and day-of calculations comprise of the determination of the optimal hourly schedule of Power Resources to meet demand and to assure appropriate levels of system operating reserve, as required, are available. The invention may also consider operating constraints, such as but not necessarily limited to, Power Resource Max/Min capability or Ramp Rate limits, as well as network constraints.

In at least one embodiment, this disclosure is directed to a computer program for use with a graphics display device, the computer program comprising a computer usable medium having computer readable program code means embodied in the medium for facilitating the systems and methods described herein, more specifically computer program code for the input of data, calculation, organization, and reporting of Power Resource dispatch schedules to meet forecasted short-term demand, while minimizing both operating costs and interchange imbalances.

The invention may take the form of a system for the determination, optimal scheduling and dispatch of Power Resources, configured to:
Receive Power Resource input data comprised of DR/DER availability parameters, market price forecasts, load forecasts, variable forecasts, generation unit availability, accumulated imbalance amount, generation unit outputs, generation cost curves, trade positions, trade hub prices, and operating reserve and regulation requirements;
Organize data according to result characteristics;
Allow for the creation of or import of a process execution trigger;
Calculate Power Resource dispatch schedules which minimize imbalances and operation costs, upon the occurrence of a trigger;
Format dispatch schedule information for a particular use;
Send dispatch schedules to another system; and
Facilitate the generation of a report utilizing dispatch schedule information.

The invention may also include a method for the determination, optimal scheduling and dispatch of Power Resources by:
Receiving Power Resource input data comprised of DR/DER availability parameters, market price forecasts, load forecasts, variable forecasts, generation unit availability, generation unit outputs, generation cost curves, trade positions, trade hub prices, and operating reserve and regulation requirements;
Organizing data according to result characteristics;
Defining or importing a process execution trigger;
Calculating Power Resource dispatch schedules which minimize operation costs, upon the occurrence of a trigger;
Formatting dispatch schedule information for a particular use;
Sending dispatch schedules to another system; and
Facilitating the generation of a report utilizing dispatch schedule information.

The details of one or more aspects of the disclosure are set forth in the accompanying drawings and the description below. Other features, objects, and advantages will be apparent from the description and drawings, and from the claims.

DETAILED DESCRIPTION OF THE INVENTION

While this invention may be embodied in many forms, there are specific embodiments of the invention described in detail herein. This description is an exemplification of the principles of the invention and is not intended to limit the invention to the particular embodiments illustrated.

For the purposes of this disclosure, like reference numerals in the figures shall refer to like features unless otherwise indicated.

In general, this disclosure is directed toward systems and methods for calculating Power Resource dispatch schedules for conventional generation, storage, and dispatchable demand-side power resources and storage resources, while minimizing operating costs and any interchange imbalances between neighboring Balancing Areas (BAs). Using the techniques of this disclosure, balancing authorities, power system operators, transmission providers, energy traders and other energy industry members are active participants and/or decision makers in the information process. Whether the participant's interest is financial, environmental, or the reliable operation of the bulk electric system the system and methods of economically calculating Power Resource dispatch schedules for conventional generation, storage, and dispatchable demand-side generation and storage resources is a technology enabler allowing participants to plan for and adjust in real-time the balance between load and demand in an economically beneficial manner.

In a particular embodiment, the invention may consider day-ahead operations to comprise of an operational horizon covering the next hour to up to any range, but typically seven or eight days in the future, with time increments of one-hour or any other preferred time increment. In another embodiment, the invention may consider day-of operations to comprise of an operational horizon covering the next few hours, including but not necessarily limited to the next 8 to 12 hours (typical duration of a shift for a Real-time Operations Desk operator), with time increments of one-hour or any other preferred time increment. In such embodiments, this operation in the day-ahead and day-of modes can determine hourly values of generation for all available power resources, hourly trades into/out-of market points (trading or scheduling locations), etc. The power resources that can be considered by the system are those that are online and available. The systems and methods disclosed herein will use available information to evaluate the status and headroom of generating units.

In another embodiment of the invention, real-time operation comprises of the short-term dispatch of available Power Resources to meet short-term demand while minimizing both operating costs and any interchange imbalances between BAs and their neighboring BAs. The horizon for the Real-Time operation may comprise of the next three hours or any other preferred length of time, and the time increments of five-minutes or any other preferred length of time.

Figure 1:
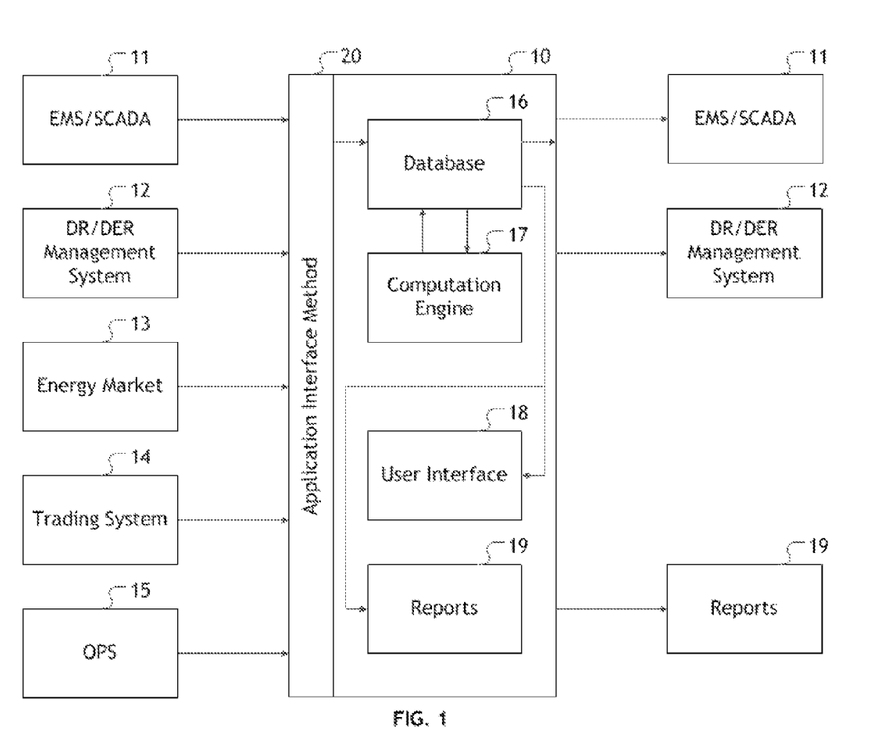
FIG. 1 is a block diagram illustrating an overview of the dataflow through one particular embodiment of the invention.

Referring to FIG. 1, the process begins with data inputs introduced into the system or method. Sources of data inputs comprise of conventional EMS/SCADA systems 11, Demand DR/DER Management Systems 12, Energy Markets 13, Trading Systems 14, and Operations System (OPS) 15, among others.

All of the data inputs required for computing the equations as listed in the current disclosure are made available from various interface applications 20 as indicated in FIG. 1. Any such application interface 20 known in the art can be implemented so long as the relevant minimum data inputs, as listed below, are consistently and reliably delivered into the system or method as described at a rate sufficient to meet the demands and data processing requirements of proving calculations for real-time operations.

In one particular embodiment, the input data provided by EMS/SCADA systems is comprised of:
  System Load Forecast (including losses) with hourly resolution, in a preferred embodiment, for up to the next eight days for day-ahead/day-of operations and five-minute resolution for up to three hours for real-time operation;
  Renewable Generation Forecast (i.e. Wind and Solar) with hourly resolution for, in a preferred embodiment, up to the next eight days for day-ahead/day-of operations and five-minute resolution for up to three hours for real-time operation;
  The committed output of conventional generating units;
  Generation availability (including de-rate and outage information for up to the next seven days for day-ahead/day-of operation);
  Reserve and Regulation requirements;
  Generator Static Characteristics (Pmin, Pmax, Ramp up, Ramp down);
  Generation cost curves; and
  A triggering signal (in one embodiment, such trigger is used for initiating day-ahead, day-of or real-time calculation processes)

In a preferred embodiment, the EMS/SCADA 11 may provide three sets of values (Average, Low, and High) for the System Load Forecast as well as Renewable Generation Forecast. The Average values can be used to compute the expected Schedule/Dispatch for the generators and DR/DER resources. The invention may then compute the energy imbalance requirement from the expected High and Low Forecast values and determine the marginal cost for providing the Energy Imbalance requirements.

In one particular embodiment, DR/DER Management System 12 input data is comprised of:
  DR/DER committed energy and reserve schedules;
  Characteristics of DR and DER resources (such as, but not necessarily limited to total capacity, ramping, durational ability, among others);
  DR/DER resource availability, specifically, the amount of DR or DER that is available for dispatch given the DR/DER constraints such as DR Program constraints; and
  DR/DER costs (if any).

In one particular embodiment, Energy Markets 13 input data is comprised of:
  Hourly Locational Marginal Prices (LMPs) at selected BA pricing locations (Hubs);
  Virtual resources at BA identified pricing locations; and
  Limits (maximum power purchased or sold) specified by users with a view to available transmission capabilities;

In one particular embodiment, Trading System 14 input data is comprised of:
  Hourly interchange schedules, i.e. deals that have been scheduled (as available for the defined day-ahead horizon, preferred as the next seven days). This includes any changes that are made to the schedule due to curtailment to the electronic tag (E-Tag);
  Hourly deals that have not been scheduled;
  Trading hub prices; and
  Locational Marginal Price (LMP) Forecast data can also be imported from some trading systems.

Locational Marginal Price Forecast data can be calculated from historical LMP data through utilization of any Locational Marginal Price Forecast application known in the art. Such LMP Forecast application can be standalone systems, incorporated into trading systems 14, or incorporated into other systems. For simplicity of explanation in the present disclosure, such LMP Forecast applications are assumed to be incorporated into a Trading System 14, although the invention is capable of considering LMP forecast data from any source.

In one particular embodiment, Operations System 15 input data is comprised of operating reserve and regulation requirements.

In one particular embodiment, the invention may take the form of a computer program 10 comprised of a computation engine 17 that interfaces with a database 16 where all the available input data is deposited/accessed. Similarly, outputs from such a computation engine 17 are written to the database 16 where they can be subsequently accessed by users via a User Interface 18 or by other systems, such as but not necessarily limited to EMS/SCADA (for conventional generation resources) 11 and DR/DER Management Systems 12 (for DR/DER resources), via appropriate interfaces or services known in the art. Data from the database 16 may also be formulated into reports 19 to be made available either within or outside of the computer program 10.

The invention formulates the economical dispatch process as a dynamic optimization problem. The objective function for the Day-Ahead and Day-Of horizon is the minimization of the operating costs over the defined operating horizon. This objective can be expressed as, $$\text{Minimize } \Sigma_{t=1}^{T} \Sigma_{i=1}^{N+1} c_i^P(p_i(t)) \tag{1}$$

Where:
$c_i^P(t)$ Is the operating cost for resource i at time step t. For trades, it is positive for purchases, and negative for sales. For generating resources it is positive. For storage resources (such as thermal or electrical storage) it is not explicitly defined, but impacts the total cost indirectly by increasing or decreasing the demand.
$p_i(t)$ Is the MW amount of the resource i at time step t and constitutes the result or output of this function. For trades, it is positive for purchases, and negative for sales. For storage resources (such as thermal storage units) it is positive in the discharge (ice melting) mode and negative in the storage (ice making) mode.
T Number of steps in horizon (for example, 48 hours for a two-day horizon). The maximum horizon length is eight days plus four hours or 196 periods.
N Number of dispatchable resources.

In this embodiment, Power Resources comprise of generating units, sales and purchases from market points, distribution resources (such as thermal storage units, controllable demand, and solar devices, among others).

If the objective function value is negative, it expresses profit, namely, the problem solution is the maximization of the net profit. In any case the cost function $c_i^P(t)$, can be expressed analytically in any number of ways. This function is preferably be expressed as either a quadratic cost function, or as a piecewise linear function. As a non-limiting example, this function will be represented as a quadratic function such as:

$$c_i^P(t) = a_i + b_i p_i(t) + c_i p_i^2(t) \qquad (2)$$

Where the coefficients ai, bi, and ci are given, and pi(t) is the amount of generation (or purchase/sale, or load) of power resource at time step t. These coefficients are, in general, also time dependent. Their dependency on time is assumed implicitly to simplify notation.

Additional "slack" resource is added to the problem formulation for the day-ahead and day-of solution (resource N+1). This resource will represent any deficit or excess at the end of the optimization. Such slack resources may be resolved and accounted for utilizing any number of methods, including but not limited to, day-ahead energy traders (during the day-ahead time horizon) or real-time traders (during day-of time horizons) may resolve the deficit or excess represented by slack resource via purchase/sales from whatever points they may want to buy or sell. Regardless of method utilized, once the deficits and excesses are solved then it is expected that the slack will be zero.

The minimization of Equation (1) is subject to Demand and Reserve Constraints, Ramp Constraints, Operating Limit Constraints, and Emission Constraints as are briefly described below.

1) Demand and Reserve Constraints $$\Sigma_{i=1}^{N+1} p_i(t) = D(t) \qquad (3)$$

$$\Sigma_{i=1}^{N+1} R_i(t) \geq R(t) \qquad (4)$$

$$\Sigma_{i=1}^{N+1} \mathrm{IE}_i(t) \geq \mathrm{IE}(t) \qquad (5)$$

$$R_i(t) \leq 10 * \mathrm{MSR}_i \qquad (6)$$

$$p_i(t) + R_i(t) + \mathrm{IE}_i(t) \leq \overline{P}_i \qquad (7)$$

Where:
D(t) Total demand at time t
R(t) Reserve requirement at time t
IE(t) Imbalance Energy requirement at time t
$R_i(t)$ Spinning reserve capacity from resource i at time step t
$\mathrm{IE}_i(t)$ Imbalance Energy capacity from resource i at time step t
$\overline{P}_i$ Upper capacity for resource i (accounting for any derates)
$\mathrm{MSR}_i$ Maximum sustained ramp rate of resource i (MW/min)

The total demand D(t) and the reserve R(t) for every time step are given quantities and are provided by EMS/SCADA 11. The maximum (and minimum) available output in each time step t is dependent on the ramping limitations of generating units.

2) Ramp Constraints $$\overline{p}_i(t) - p_i(t-1) \leq \mathrm{RU}_i \qquad (8)$$

$$\underline{p}_i(t) - p_i(t-1) \geq -\mathrm{RD}_i \qquad (9)$$

Where RUi is the ramp-up limit (ramp up rate times dispatch interval) and RDi is the ramp-down limit (ramp down rate times dispatch interval) for Power Resource i.

3) Operating Limit Constraints $$\underline{p}_i(t) \leq p_i(t) \leq \overline{p}_i(t) \qquad (10)$$

$$\underline{P}_i \leq \overline{p}_i(t) \leq \overline{P}_i; \underline{P}_i \leq \underline{p}_i(t) \leq \overline{P}_i \qquad (11)$$

Where:
$\underline{P}_i$ Lower capacity for resource i (Pmin; may be greater than 0 for an online resource)
$\overline{P}_i$ Upper capacity for resource i (accounting for any derates)

4) Emission Constraints

Emissions may be incorporated as an additional linear penalty in the objective function as opposed to or in addition to explicit constraints through the addition of a term of the below form to the objective function where the function Ei(pi(t)) is a non-negative linear function of pi(t).

$$\Sigma_{t=1}^{T} \Sigma_{i=1}^{Ng} E_i(p_i(t)) \qquad (12)$$

The results of the day-ahead/day-of calculation are the amounts of Power Resource i at time step t, pi(t) and the reserve Ri(t) from Power Resource i. The results (pi(t)) include the base points for the dispatchable generators, the DR/DER schedules, potential trades, and any supply/demand surplus or shortfalls. In one embodiment, these calculations are performed in a computation engine 17 with resulting values all written to a database 16 and can be made accessible via the user interface 18.

The invention formulates real-time dispatch in a similar manner as the hourly dispatch of Equations (1) to (12), except that there are no imbalance energy requirements in real-time (since the imbalance requirements are satisfied automatically by the resulting dispatch Base Points). The horizon in this case can be configurable, but in a preferred embodiment is from one to three hours, and the time step is five-minutes. Therefore, for the preferred horizon of three hours, there are 36 steps.

Another important difference is that for this embodiment of real-time problem formulation, an "accumulated imbalance correction" (AIC) term may be added to the objective function, which represents the amount of cumulative Area Control Error (or past inadvertent interchange) that must be eliminated over a specified number of dispatch intervals. This incorporation results in the modified objective, $$\text{Minimize } \Sigma_{t=1}^{T} \Sigma_{i=1}^{N=1} c_i^P(p_i(t)) - (w^* (\Sigma_{t=1}^{TI} (\Sigma_{i=1}^{N} p_i(t) - D(t))/12 - \mathrm{AIC}))^2) \qquad (13)$$

Where AIC is the amount of accumulated imbalance (MWh) that must be eliminated over the next TI (<T) steps of the real-time dispatch process and w is a tunable weighting factor in $/MWh. The accumulated imbalance amount is an input to the process provided to the system by EMS/SCADA. The objective is to reduce or eliminate the imbalance as quickly as possible.

The real-time dispatch consists of the minimization of the objective function of Equation (13), subject to the constraints of Equations (3) to (12) as previously defined. The number of periods for this dynamic problem in the preferred embodiment is 36 (although the number of periods can be configurable to suit a particular purpose) and the step between periods is only five-minutes.

The main result of this calculation is the amount in megawatts of Power Resource i at time step t, $p_i$ (t). It includes the base points for the dispatchable generators, the DR/DER schedules, potential trades, and any supply/demand surplus or shortfalls. In one embodiment, these calculations are performed in a computation engine 17 with resulting values written to a database 16 and can be made accessible via the user interface 18, or used by the EMS/SCADA system and DR/DER Management System for optimal dispatch of Power Resources.

The optimization of equations (1) to (9) in the Day-Ahead, and equations (2) to (9) with the objective of equation (13) for the real-time, are nonlinear optimization problems. These optimization problems can be solved as a global optimization incorporating time and resources as defined by the above equations. In a preferred embodiment, there is a global optimization over the T steps.

In one embodiment, the main result of the calculation performed within the computation engine 17 is the Power Resource values pi(t), in MWs, for all Power Resources available to the system and for all the time steps of the calculating horizon. These results also include all the marginal costs (prices) of meeting the constraints and reserved capacity for operating reserves as well as marginal cost of meeting the energy imbalance in the day-ahead operation. These values can be used to determine the costs/prices of meeting the demand requirement, required energy imbalance, or the reserve requirements.

Figure 2:
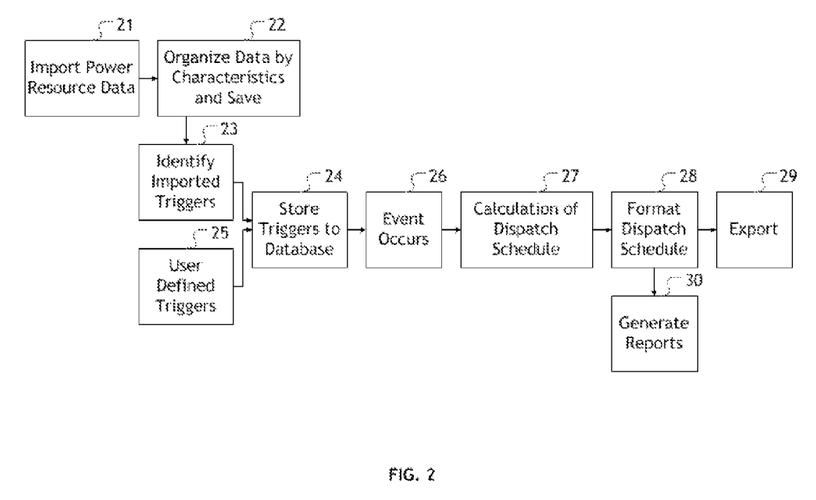
FIG. 2 is a block diagram illustrating the basic components of a computer realization of the invention.

Turning now to FIG. 2, the present disclosure operates in various operational time periods, each of which may require a reevaluation or recalculation of dispatch schedule. Various input data, including but not necessarily limited to, Power Resource data, data from EMS/SCADA legacy Energy Management Systems (EMS), legacy Supervisory Control and Data Acquisition (SCADA) Systems, Demand Response (DR) and Distributed Energy Resources (DER) monitor, control, schedule, and lifecycle management systems (DR/DER Management System), and Energy Markets, electrical energy commodity trading systems (Trading Systems), and Operations System (OPS), are imported 21 into the system or method. Such imported data may then be organized by various characteristics 22 and saved for later use. Data imported 21 from EMS/SCADA 11 systems, or other sources of Power Resource input data, may comprise of EMS/SCADA defined execution triggers. In some embodiments, such imported execution triggers may be identified 23 from the imported data and saved 24. In some embodiments, execution triggers may be defined 25 by a user and saved 24. Reevaluation or recalculation may be initiated by these various execution triggers as imported and identified 23 or as defined 25 within the system, depending on operation time period. Execution triggers may be periodic, event driven, and/or manual. In one particular embodiment, periodic and manual execution triggers can be defined 25 within the systems or methods through the User Interface 18. Execution based on event or EMS/SCADA 11 imported triggers 23 is automatic and may take place in day-ahead/day-of or real-time operation.

Changes in forecast quantities beyond designated thresholds or changes in maintenance schedules may likely render prior system results invalid. This is more important for day-ahead and periodic hourly (day-of) system execution results. Without re-calculation of dispatch schedule, the existing results could remain invalid for an extended time before the change is caught and compensated for through periodic execution or manually triggered intervention. It is less important for real-time system execution because without a real-time EMS/SCADA 11 trigger, the time lapse until correction of the prior base points by the next periodic Real-Time execution is minimal and often when the impact of the Real-Time changes in EMS/SCADA 11 is significant enough in impact, reliability overrides economics, and immediate update of economic base points is less important.

In one particular embodiment, events where pre-designated EMS/SCADA-monitored quantities cross pre-designated threshold levels, or when a pre-designated EMS/SCADA-monitored status change takes place can be imported 23 from EMS/SCADA 11 or otherwise defined and entered 25 through a UI 18. Such threshold or status change events may comprise of changes in system load forecast above a pre-designated level compared to last periodic system execution, change in renewable generation forecast above a pre-designated level compared to last periodic system execution, change in net interchange schedule above a pre-designated level compared to last periodic system execution, change in a reserve requirements beyond a pre-designated threshold compared to last periodic system execution, or a change in regulation requirements beyond a pre-designated threshold compared to last periodic system execution, among others. Moreover, status elements monitored by an EMS/SCADA 11 may be included into system triggers. Various changes in status can be incorporated into the system, including but not necessarily limited to, a change in a generating unit outage schedule that is on the EMS/SCADA monitored list, a change in tie-line outage or restoration schedule for tie-lines on the EMS/SCADA monitored list, among others. The occurrence of such events 26 would then trigger execution 27 within the system.

In one particular embodiment where a EMS/SCADA 11 has the ability to monitor a list of status changes or analog measurement changes and detect change in status or larger than specified threshold changes in analog measurement, the detection of such changes will trigger the system real time calculation process.

Day-ahead/day-of triggers typically pertain to changes in the forecast of pre-designated monitored quantities or changes in maintenance/outage schedules, whereas real-time triggers typically pertain to situations where pre-designated EMS/SCADA-monitored quantities cross pre-designated threshold levels, or pre-designated EMS/SCADA-monitored status changes take place.

Upon calculation or recalculation 27 of dispatch schedules, the systems and methods may, in one embodiment, format 28 the dispatch schedule for any various uses, including but not limited to export 29 to other systems or generation of reports 30 for study or archive.

In particular embodiments of the disclosure, various inputs and calculated outputs of the system can be visually represented and made available for use and review through a User Interface 18. Such User Interface 18 displays may comprise of the following displays, among others:

A display for viewing and modification of user inputs and

A display for viewing of system results/dispatch schedules

In another embodiment, the system and methods may also provide for study mode ("what if" mode) Case Creation, Editing and Execution functionality, where the ability to make changes to the input parameters of the system and manually execute calculations will be available. Such results may be distinguished from production/actual results through any means known in the art, including flagging such execution results programmatically as "Study" instead of the normal production execution. The following parameters may be available for modification under such the "what if" mode execution of the system:

System Load Forecast;

Variable Generation Forecast;

Reserve and regulation requirements;

Change in bi-lateral trade (MW and price);

Fixed schedule for a conventional resource (where outages of such resources can outages can be simulated by indicating a zero contribution); and Fixed schedule for DER.

Study mode viewing of application results may include the following parameters and may be able to compare the study results with the results from a Base run:

Marginal cost of meeting system load requirements;

Marginal cost of meeting system reserve requirements;

Total cost of meeting system requirements; and

Excess or Shortage of system requirements, for example slack

Figure 3:
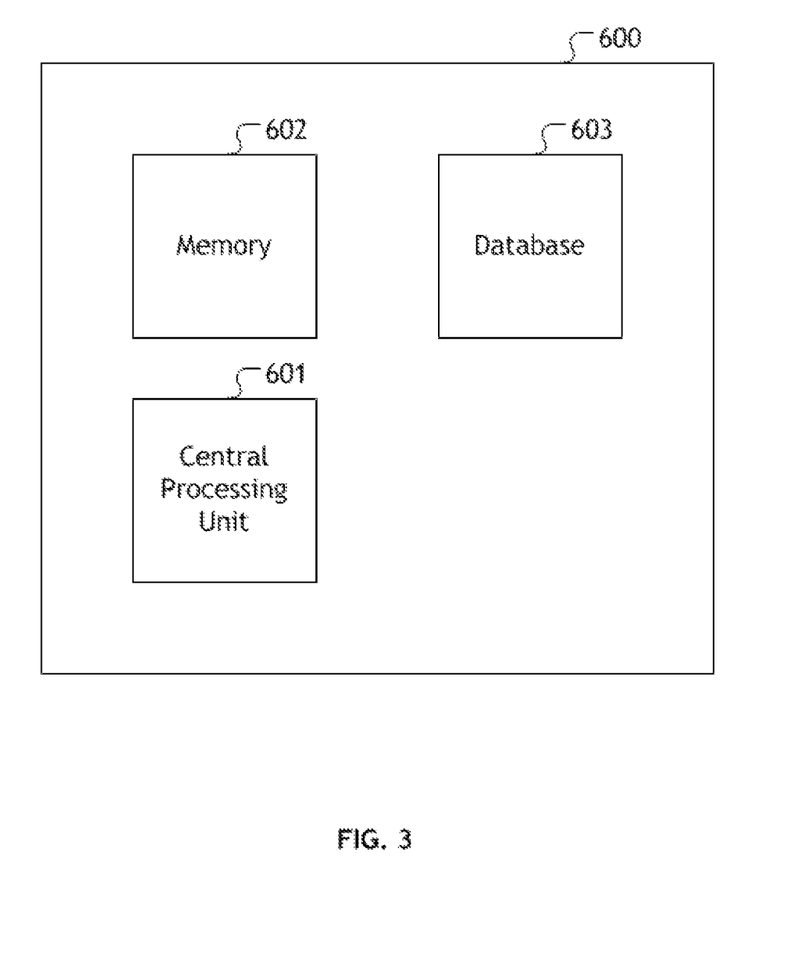
FIG. 3 is a block diagram illustrating a computer system that may be utilized in the performance of the disclosed system and methods/processes.

Some or all of the previously discussed embodiments may be performed utilizing a computer or computer system. An example of such a computer or computer system is illustrated in FIG. 3. Computer 600 contains Central Processing Unit 601. Central Processing Unit 601 may perform some or all of the processes involved in the previously discussed embodiments. Central Processing Unit 601 may utilize information, such as but not limited to computer programs, contained in Memory 602, Database 603, or both. Central Processing Unit 601 may also write information to Memory 602, Database 603, or both. While in this FIG. 2 only one Computer 600 is shown, some embodiments may make use of multiple computers or computer systems. In some embodiments some of these computers or computer systems may not have dedicated memory or databases, and may utilize memory or databases that are external to the computer or computer system.

Conventional economic dispatch algorithms focus primarily on active power dispatch. Ignoring the power factor of dispatched resources can lead to uneconomic or reliability degrading outcome. The system and methods described herein takes into account the power factor of distributed resources thus avoiding such outcome.

As a non-limiting example of a particular embodiment of the system and methods giving due consideration of DR Power Factor: If a 13.8 kV distribution feeder has 9 MW load with unity power factor consisting of 3 MW constant impedance, 3 MW constant current, and 3 MW constant power load. It also has 10% of its load (i.e., 900 kW) registered as DR with 0.8 Lag Power Factor (where DR happens to be a motor load). When the systems and methods dispatch DR, it takes into account the impact of power factor on voltage for the base load, thus computing the correct amount of available DR. Thus in dispatching the 900 kW DR, the invention computes the power factor of the remaining load:

Step 1: The reactive power for 900 kW DR with 0.8 power factor is computed as follows:

$$QDR=-900*SQRT(1-0.8^2)=-900*0.6=-560 \text{ kVar}$$

Step 2: The remaining load (after dispatch of DR) is computed as:

$$P=9,000-900=8,100 \text{ kW}$$

$$Q=0-(-560)=560 \text{ kVar}$$

Power Factor=8,100/SQRT(8,100$^2$+560$^2$)=0.069 Lead

Step 3: The leading power factor increases the voltage based on sensitivity factor provided as input data to disclosed invention. In this example the sensitivity factor shows an increase of 1.5% in nominal voltage.

Step 4: The impact on the base load is computed as follows:

Constant impedance base load increase: 2*3,000 kW*1.5%=90 kW

Constant current base load increase=1*3,000 kW*1.5%=45 kW

Constant power base load change=0 kW

Total base load increase=90+45+0=135 kW

Step 5: The systems and methods disclosed herein then compute the net available DR as:

900 kW−135 kW=765 kW (rather than 900 kW)

Moreover, conventional economic dispatch algorithms developed and used thus far are based on the premise that the system is three-phase-balanced. This assumption breaks down when using distributed resources on individual phases. Dispatch of aggregated distributed assets (VPPs) without due consideration of phase balancing can result in neutral currents, increased losses, and reliability degradation. The systems and methods disclosed herein take the phase connectivity of dispatchable distributed resources into account, ensuring assets are scheduled and dispatched in such a way as to ensure phase balance. The following scenario illustrates how a particular embodiment of the disclosed systems and methods may work in this regard.

In a non-limiting example of a particular embodiment of the invention, a distribution feeder with a 9 MW phase-balanced load has 10% of its load (i.e., 900 kW) registered as DR, with 300 kW DR on Phase A, 270 kW DR on Phase B, and 330 kW DR on Phase C. Here, the input data may include this information as well as a table indicating neutral currents and losses associated with different levels of feeder load phase unbalance. In dispatching the DR, since the initial load is phase-balanced, the systems and methods disclosed herein dispatches DR in a balanced way to the extent possible; otherwise it accounts for neutral losses due to phase imbalance:

For DR dispatch below 810 kW:

Step 1: The invention allocates the DR equally among the three phases. For example, for 810 MW DR dispatch, this amounts to 270 kW per phase.

Step 2: Compute the net load per phase: 3,000−270=2,780 kW per phase

Step 3: Neutral current and neutral losses are zero since the net load is balanced Step 4: Dispatched DR is effectively 810 MW For DR dispatch above 810 kW the invention will dispatch unbalanced DR, but computes the net available DR by looking up the neutral losses resulting from Phase unbalance. For example, for 900 kW DR:

Step 1: The invention allocate all registered DR on each phase as available

Step 2: Compute the remaining net base load
Phase A: 3,000 kW−300 kW=2,700 kW
Phase B: 3,000 kW−270 kW=2,730 kW
Phase C: 3,000 kW−330 kW=2,670 kW Step 3: The neutral current and losses for unbalanced net load 2,700/2,730/2,670 are then read off from the look-up table; e.g., the invention may reads off neutral losses of 30 kW.

Step 4: The invention computes the net available DR as 900 kW−30 kW=870 kW (rather than 900 kW).

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. A system for determining optimal scheduling and dispatch of power resources comprising:
    a computer program for use with a computer having a memory;
    a database;
    the computer program running in the memory and for the input of data, which is stored in the database, and for calculation, organization, and reporting of power resource dispatch schedules to meet forecasted short-term demand, while minimizing both operating costs and interchange imbalances;
    a application interface;
    in which the computer program is configured to:
        receive power resource input data comprised of energy management system data, supervisory control and data acquisition data, demand response/distributed energy resources availability parameter data, energy market data, trading system data and operation systems data;
        organize the input data according to result characteristics;
        allow for the creation of or import of a process execution trigger;
        calculate power resource dispatch schedules which minimize imbalances and operation costs, upon the occurrence of the process execution trigger;
        format dispatch schedule information for a particular use;
        send dispatch schedules to second system, and
        facilitate the generation of a report utilizing dispatch schedule information wherein the computer program dynamically optimizes resources in accordance with the formula:

Minimize $\Sigma_{t=1}^{T} \Sigma_{i=1}^{N+1} C^P_i(p_i(t))$ where $C^P_i(p_i(t))$ is the operating cost for resource i at time step t;
        $p_i(t)$ is the power amount (MW) of the resource i at time step t and constitutes the result or output of this function;
        T is the number of steps in horizon, and
        N is the number of dispatchable resources.

2. The system of claim 1 wherein the cost function is:

$c_i^P(t) = a_i + b_i p_i(t) + c_i p_i^2(t)$ where the coefficients ai, bi, and ci are given, and pi(t) is the amount of generation, purchase/sale, or load of power resource at time step t.

3. The system of claim 1 wherein the minimization equation is subject to demand and reserve constraints:

$\Sigma_{i=1}^{N+1} p_i(t) = D(t)$;

$\Sigma_{i=1}^{N+1} R_i(t) \geq R(t)$;

$\Sigma_{i=1}^{N+1} IE_i(t) \geq IE(t)$;

$R_i(t) \leq 10 * MSR_i$;

$p_i(t) + R_i(t) + IE_i(t) \leq \overline{P}_i$, where:
    D(t) Total demand at time t;
    R(t) Reserve requirement at time t;
    IE(t) Imbalance Energy requirement at time t;
    $R_i(t)$ Spinning reserve capacity from resource i at time step t;
    $IE_i(t)$ Imbalance Energy capacity from resource i at time step t;
    $\overline{P}_i$ Upper capacity for resource i (accounting for any derates), and
    $MSR_i$ Maximum sustained ramp rate of resource i (MW/min).

4. The system of claim 1 wherein the minimization equation is subject to ramp constraints:

$\overline{p}_i(t) - p_i(t-1) \leq RU_i$ $\underline{p}_i(t) - p_i(t-1) \geq -RD_i$ where RUi is the ramp-up limit (ramp up rate times dispatch interval) and RDi is the ramp-down limit (ramp down rate times dispatch interval) for Power Resource i.

5. The system of claim 1 wherein the minimization equation is subject to operating limit constraints:

$\underline{p}_i(t) \leq p_i(t) \leq \overline{p}_i(t)$;

$\underline{P}_i \leq \overline{p}_i(t) \leq \overline{P}_i; \underline{P}_i \leq \underline{p}_i(t) \leq \overline{P}_i$;

where:
    $\underline{P}_i$ Lower capacity for resource i;
    $\overline{P}_i$ Upper capacity for resource i.

6. The system of claim 1 wherein the minimization equation is subject to emission constraints:

$\Sigma_{t=1}^{T} \Sigma_{i=1}^{N_g} E_i(p_i(t))$ where the function $E_i(p_i(t))$ is a non-negative linear function of $p_i(t)$.

7. The system of claim 1 wherein the minimization equation is subject to ramp constraints.

8. A method for the determination, optimal scheduling and dispatch of power resources comprising the steps of:
    receiving power resource input data comprised of energy management system data, supervisory control and data acquisition data, demand response/distributed energy resources availability parameter data, energy market data, trading system data and operation systems data;
    organizing the input data according to result characteristics;
    defining or importing a process execution trigger;
    calculating power resource dispatch schedules which minimize operation costs, upon the occurrence of the process execution trigger;
    formatting dispatch schedule information for a particular use;
    sending dispatch schedules to a second system, and
    facilitating the generation of a report utilizing dispatch schedule information,
        wherein the computer program dynamically optimizes resources in accordance with the formula:

Minimize $\Sigma_{t=1}^{T} \Sigma_{i=1}^{N+1} C^P_i(p_i(t))$ where $C^P_i(p_i(t))$ is the operating cost for resource i at time step t;
        $p_i(t)$ is the power amount (MW) of the resource i at time step t and constitutes the result or output of this function;
        T is the number of steps in horizon, and
        N is the number of dispatchable resources.

9. The method of claim 8 wherein the cost function is:

$c_i^P(t) = a_i + b_i p_i(t) + c_i p_i^2(t)$ where the coefficients ai, bi, and ci are given, and pi(t) is the amount of generation, purchase/sale, or load of power resource at time step t.

10. The method of claim 8 wherein the minimization equation is subject to demand and reserve constraints:

$$\Sigma_{i=1}^{N+1} p_i(t) = D(t);$$

$$\Sigma_{i=1}^{N+1} R_i(t) \geq R(t);$$

$$\Sigma_{i=1}^{N+1} IE_i(t) \geq IE(t);$$

$$R_i(t) \leq 10 * MSR_i;$$

$$p_i(t) + R_i(t) + IE_i(t) \leq \overline{P}_i,$$

where:
D(t) Total demand at time t;
R(t) Reserve requirement at time t;
IE(t) Imbalance Energy requirement at time t;
$R_i(t)$ Spinning reserve capacity from resource i at time step t;
$IE_i(t)$ Imbalance Energy capacity from resource i at time step t;
$\overline{P}_i$ Upper capacity for resource i (accounting for any derates), and
$MSR_i$ Maximum sustained ramp rate of resource i (MW/min).

11. The method of claim 8 wherein the minimization equation is subject to ramp constraints:

$$\overline{p}_i(t) - p_i(t-1) \leq RU_i$$

$$\underline{p}_i(t) - p_i(t-1) \geq -RD_i$$

where RUi is the ramp-up limit (ramp up rate times dispatch interval) and RDi is the ramp-down limit (ramp down rate times dispatch interval) for Power Resource i.

12. The method of claim 8 wherein the minimization equation is subject to ramp constraints.

13. The method of claim 8 wherein the minimization equation is subject to operating limit constraints:

$$\underline{p}_i(t) \leq p_i(t) \leq \overline{p}_i(t);$$

$$\underline{P}_i \leq \overline{p}_i(t) \leq \overline{P}_i; \underline{P}_i \leq \underline{P}_i(t) \leq \overline{P}_i;$$

where:
$\underline{P}_i$ Lower capacity for resource i;
$\overline{P}_i$ Upper capacity for resource i.

14. The method of claim 8 wherein the minimization equation is subject to emission constraints:

$$\Sigma_{t=1}^{T} \Sigma_{i=1}^{Ng} E_i(p_i(t))$$

where the function $E_i(p_i(t))$ is a non-negative linear function of $p_i(t)$.

* * * * *

UNITED STATES PATENT AND TRADEMARK OFFICE
CERTIFICATE OF CORRECTION

PATENT NO. : 9,865,024 B2
APPLICATION NO. : 14/216138
DATED : January 9, 2018
INVENTOR(S) : Sasan Mokhtari et al.

Page 1 of 1

It is certified that error appears in the above-identified patent and that said Letters Patent is hereby corrected as shown below:

In the Claims

Column 13, Line 15, delete "a" and replace with "an".

Signed and Sealed this
Twenty-ninth Day of May, 2018

Andrei Iancu
*Director of the United States Patent and Trademark Office*